US011292342B1

(12) United States Patent
Ignaczak et al.

(10) Patent No.: US 11,292,342 B1
(45) Date of Patent: Apr. 5, 2022

(54) SYSTEMS AND METHODS FOR ALERTING A DRIVER TO CHECK BACK SEAT OCCUPANCY IN A VEHICLE

(71) Applicant: Ford Global Technologies, LLC, Dearborn, MI (US)

(72) Inventors: Brad Ignaczak, Canton, MI (US); Jonathan Diedrich, Carleton, MI (US); Cynthia Neubecker, Westland, MI (US); Brian Bennie, Sterling Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/120,644

(22) Filed: Dec. 14, 2020

(51) Int. Cl.
*B60Q 1/00* (2006.01)
*B60K 35/00* (2006.01)
*B60Q 9/00* (2006.01)
*B60N 2/26* (2006.01)
*B60N 2/00* (2006.01)

(52) U.S. Cl.
CPC ............. *B60K 35/00* (2013.01); *B60N 2/002* (2013.01); *B60N 2/26* (2013.01); *B60Q 9/00* (2013.01); *B60K 2370/149* (2019.05); *B60K 2370/152* (2019.05); *B60K 2370/171* (2019.05); *B60K 2370/178* (2019.05); *B60K 2370/21* (2019.05)

(58) Field of Classification Search
CPC . B60N 2/002; B60N 2/26; B60Q 9/00; B60K 35/00; B60K 2370/149; B60K 2370/152; B60K 2370/178; B60K 2370/171; B60K 2370/21
USPC ........................................................ 340/457
See application file for complete search history.

(56) References Cited

U.S. PATENT DOCUMENTS 5,874,891 A * 2/1999 Lowe .................. B60Q 1/52
340/433
10,272,920 B2 * 4/2019 Shikii ................. B60W 50/14
(Continued)

FOREIGN PATENT DOCUMENTS

| CN | 105083291 B | 11/2018 |
| JP | 2009280196 A | 12/2009 |
| KR | 101241861 B1 | 3/2013 |

OTHER PUBLICATIONS

Jim Henry, "Safety Idea Gets a Mandate", Automotive News, Continental Technology Trends—5G Connectivity, Crain Communications, ISSN 0005-1551, Aug. 17, 2019, 9 pages.

*Primary Examiner* — Zhen Y Wu
(74) *Attorney, Agent, or Firm* — Frank Lollo; Eversheds Sutherland (US) LLP (57) ABSTRACT

The disclosure generally pertains to systems and methods for detecting an occupancy of a back seat in a vehicle before a driver exits the vehicle. In one example method, a backseat occupancy alert system detects an activity that precedes the driver exiting the vehicle. For example, the system may detect that the driver has performed, or is performing, actions such as turning off the engine of the vehicle, placing the vehicle in a parked condition, and/or opening a door of the vehicle. The detection may be carried out, for example, by evaluating an image captured by one or more cameras in the vehicle. The system may then detect a failure by the driver to look towards a back seat of the vehicle, where, for example, a child may be seated in a car seat. The system may then produce an alert to prompt the driver to check the back seat.

20 Claims, 5 Drawing Sheets

(56) References Cited

U.S. PATENT DOCUMENTS

| | | | |
|---|---|---|---|
| 10,446,011 B2 * | 10/2019 | Yamamoto | B60N 2/002 |
| 10,723,267 B2 * | 7/2020 | Kothari | H04N 5/23216 |
| 2008/0259475 A1 * | 10/2008 | Bush | B60R 1/008 |
| | | | 359/844 |
| 2009/0146912 A1 * | 6/2009 | Hiramatsu | G01C 21/3688 |
| | | | 345/2.2 |
| 2009/0174774 A1 * | 7/2009 | Kinsley | B60R 1/00 |
| | | | 348/148 |
| 2012/0050021 A1 * | 3/2012 | Rao | B60R 99/00 |
| | | | 340/425.5 |
| 2014/0098232 A1 | 4/2014 | Koike | |
| 2015/0105976 A1 * | 4/2015 | Shikii | B60H 1/00742 |
| | | | 701/36 |
| 2015/0294169 A1 | 10/2015 | Zhou et al. | |
| 2016/0176380 A1 * | 6/2016 | Demeritte | B60R 22/48 |
| | | | 340/687 |
| 2016/0379466 A1 * | 12/2016 | Payant | G08B 21/22 |
| | | | 340/457 |
| 2017/0013188 A1 * | 1/2017 | Kothari | B60R 1/00 |
| 2018/0173230 A1 * | 6/2018 | Goldman-Shenhar | |
| | | | B60W 50/08 |
| 2019/0057595 A1 * | 2/2019 | Yamamoto | G08B 21/22 |
| 2020/0023770 A1 * | 1/2020 | Kim | B60Q 1/00 |
| 2020/0086785 A1 * | 3/2020 | Lee | B60Q 9/00 |
| 2021/0061301 A1 * | 3/2021 | Denthumdas | B60Q 3/16 |

* cited by examiner

SYSTEMS AND METHODS FOR ALERTING A DRIVER TO CHECK BACK SEAT OCCUPANCY IN A VEHICLE

BACKGROUND

A child may unintentionally be left behind in an unattended vehicle. In one scenario, a driver of a vehicle may be preoccupied with other matters and exit the vehicle after shutting down the engine and locking the vehicle. It is therefore desirable to provide a solution to alert the driver in such a scenario and prevent such a situation.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

In terms of a general overview, this disclosure is directed to systems and methods for detecting an occupancy of a back seat in a vehicle before a driver of the vehicle exits the vehicle. This action may be carried out in order to detect a child who is being left behind in the back seat of the vehicle due to an oversight on the part of a driver. In one example method, a backseat occupancy alert system detects an activity that precedes the driver exiting the vehicle. For example, the backseat occupancy alert system may detect that the driver has performed, or is performing, actions such as switching off the engine of the vehicle, placing the vehicle in a parked condition, and/or opening a door of the vehicle. In one example implementation, the detection may be carried out by evaluating an image captured by one or more cameras in the vehicle. If the driver appears to be exiting the vehicle, the backseat occupancy alert system may determine whether the driver has looked towards the back seat of the vehicle. In an example scenario, a child may be seated in a car seat mounted on the back seat of the vehicle. Upon detecting a failure on the part of the driver to look towards the back seat, the backseat occupancy alert system may produce an alert to prompt the driver to check back seat occupancy.

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionality described with respect to a particular device or component may be performed by another device or component.

Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. It should also be understood that the word "example" as used herein is intended to be non-exclusionary and non-limiting in nature.

Furthermore, certain words and phrases that are used herein should be interpreted as referring to various objects and actions that are generally understood in various forms and equivalencies by persons of ordinary skill in the art. More particularly, the word "vehicle" as used in this disclosure can pertain to any one of various types of vehicles such as cars, vans, sports utility vehicles, trucks, electric vehicles, gasoline vehicles, and hybrid vehicles. The word "seat" as used herein encompasses any of various types of seats that can be provided in a vehicle, such as, for example, a bucket seat, a bench seat, a swivel seat. The phrase "child seat" as used herein can be any type of seating device that can be mounted upon a seat of a vehicle, such as, for example, an infant seat that is mounted upon a seat of a vehicle by use of seat belts.

Figure 1:
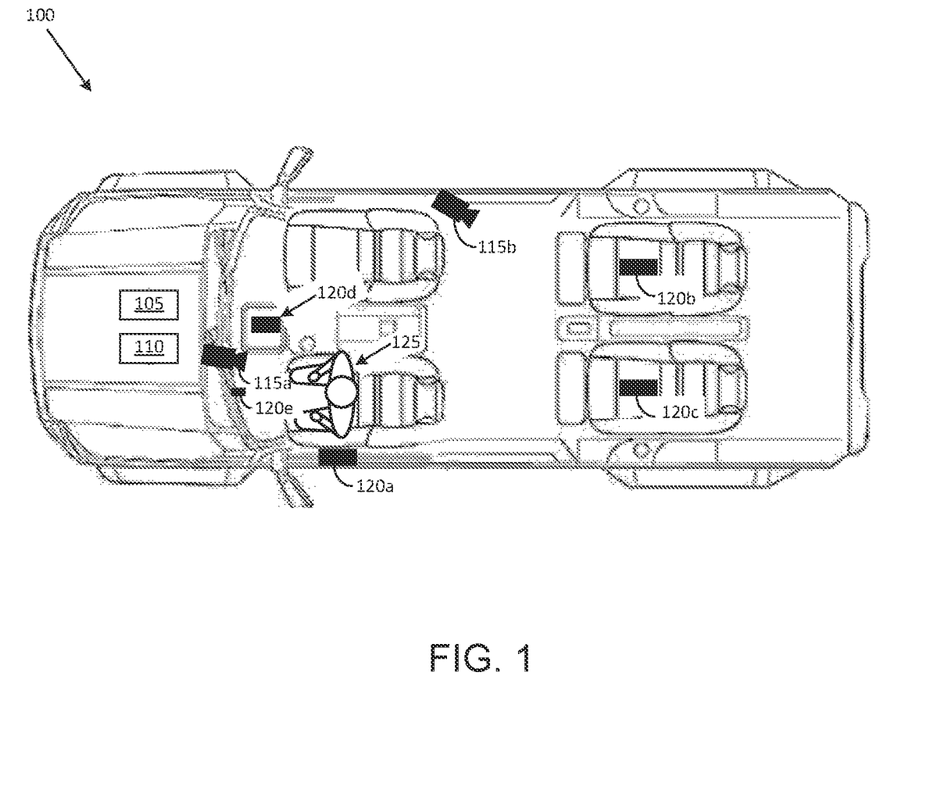
FIG. 1 illustrates an example vehicle that includes a backseat occupancy alert system in accordance with an embodiment of the disclosure.

FIG. 1 illustrates an example vehicle 100 that includes a backseat occupancy alert system in accordance with an embodiment of the disclosure. The backseat occupancy alert system may be implemented in a variety of ways and can include various type of components. An example backseat occupancy alert system can include some components that are a part of the vehicle 100, some that are carried by a driver 125 and/or a passenger of the vehicle 100, and others that may be accessible via a communications network (not shown). The components that can be a part of the vehicle 100 can include a vehicle computer 105, an auxiliary operations computer 110, an imaging system 115 that can include one or more cameras such as a camera 115a and a camera 115b, and a sensor system 120 that can include one or more sensors such as a sensor 120a, a sensor 120b, a sensor 120c, a sensor 120d, and a sensor 120e. The one or more cameras can be any of various types of cameras such as, for example, a digital camera that produces images in a compressed or uncompressed digital format; a video camera that produces video clips; or a video camera that produces streaming video.

The vehicle computer 105 may perform various functions such as, for example, controlling engine operations (fuel injection, speed control, emissions control, braking, etc.), managing climate controls (air conditioning, heating etc.), activating airbags, and issuing warnings (check engine light, bulb failure, low tire pressure, vehicle in blind spot, etc.). The vehicle computer 105 may also control operations of the vehicle 100 in response to driver actions, such as, for example, adjusting an air-fuel mixture to an engine of the vehicle 100 when the driver 125 accelerates, coasts, brakes, or stops the vehicle 100. In some cases, the vehicle computer 105 may produce signals that represent actions performed by the vehicle computer 105 and/or the driver 125. For example, a "parked" signal may be produced by the vehicle computer 105 when a gear shifter in the vehicle 100 is moved from a drive position to a parked position. The parked signal may be displayed on a display system in the vehicle 100 and may also be transmitted to the auxiliary operations computer 110 for performing some operations of the backseat occupancy alert system in accordance with the disclosure. As another example, various signals may be produced by the vehicle computer 105 to indicate to the auxiliary operations computer 110, an operating status of the engine of the vehicle 100 such as, for example, when the driver 125 shuts off the engine.

The auxiliary operations computer 110 may perform such operations in cooperation with the imaging system 115 and/or the sensor system 120. Some example operations performed by the auxiliary operations computer 110 in accordance with the disclosure are described below.

The imaging system 115 can include a single camera that is configured to capture an image and/or video of an interior portion of a cabin area of the vehicle 100. Such a camera can propagate the image and/or video to the auxiliary operations computer 110 to allow the auxiliary operations computer 110 to determine a direction of gaze of the driver 125 of the vehicle and verify passenger occupancy inside the vehicle 100. In the example configuration illustrated in FIG. 1, the imaging system 115 includes the camera 115a that is arranged to capture images that provide information pertaining to the driver 125, such as a direction of gaze of the driver 125 and actions performed by the driver 125 (operating a gear shifter, opening a door of the vehicle 100, etc.). The information may be transferred from the camera 115a to the auxiliary operations computer 110 in any suitable manner such as, for example, in the form of an image, a video clip, or digital data. The imaging system 115 further includes the camera 115b that is arranged to capture information pertaining to an occupancy of the back seat of the vehicle 100. In one implementation, the field of view of the camera 115b can preclude a view of the driver 125 and/or a front seat of the vehicle 100.

The sensor system 120 can include one or more of various types of sensors, such as, for example, motion sensors, pressure sensors, radar sensors, and infrared sensors. In the example configuration illustrated in FIG. 1, the sensor system 120 includes a sensor 120a that is mounted upon a door handle assembly of the driver's door. The sensor 120a is configured to generate a signal that can indicate to the auxiliary operations computer 110, an activation of the door handle on the driver's door. This signal may be transferred from the sensor 120a to the auxiliary operations computer 110 in any suitable manner such as, for example, in the form of digital data. In one example implementation, the digital data may be provided in a binary format with a "1" indicating the door handle is in a position wherein the door has been opened by the driver 125. A "0" signal can indicate a default condition wherein the door is in a closed condition.

In another example implementation, the digital data may be provided in the form of a digital code (2 or more digital bits). For example, a first digital code "01" may be generated by the sensor 120a and transferred to the auxiliary operations computer 110 when the door has been completely opened by the driver 125. The auxiliary operations computer 110 may interpret the "01" code as indicating that the driver 125 has opened the door and is exiting the vehicle 100. The auxiliary operations computer 110 may confirm the interpretation by obtaining one or more images from the camera 115a and evaluating the image(s) to determine if the driver 125 is in the process of exiting the vehicle 100 or has already exited the vehicle 100.

A second digital code "10" may be generated by the sensor 120a and transferred to the auxiliary operations computer 110 when the door has been partially opened by the driver 125. The auxiliary operations computer 110 may interpret the "10" code as indicating that the driver 125 is in the process of opening the door and intends to exit the vehicle 100. The auxiliary operations computer 110 may confirm the interpretation by obtaining one or more images from the camera 115a and evaluating the image(s) to determine if the driver 125 is in the process of exiting the vehicle 100.

A third digital code "00" may be generated by the sensor 120a and transferred to the auxiliary operations computer 110 when the door handle has not been operated and the door is completely closed. The auxiliary operations computer 110 may interpret the "00" code as indicating that the driver 125 does not intend to exit the vehicle 100. The auxiliary operations computer 110 may confirm the interpretation by obtaining one or more images from the camera 115a and evaluating the image(s) to determine that the driver 125 is seated in the vehicle 100 and does not intend to exit the vehicle 100.

In the example configuration illustrated in FIG. 1, the sensor system 120 further includes a sensor 120b that is located upon a back seat of the vehicle 100 on the passenger side. The sensor 120b can be a pressure sensor or a motion sensor, for example, configured to generate a signal that can indicate to the auxiliary operations computer 110, that a passenger is seated in the back seat on the passenger side. The passenger can be a child or an infant, for example. In some cases, the child or infant may be seated in a child seat. In these cases, the sensor 120b can be located on the child seat.

Another sensor 120c may be located upon a back seat of the vehicle 100 on the driver side. The sensor 120c is configured to generate a signal that can indicate to the auxiliary operations computer 110, an indication that a passenger is seated in the back seat on the driver side. The sensor 120c can be located on a child seat if the child seat is located on the back seat on the driver side.

Another sensor 120d may be attached to a gear shifting assembly of the vehicle 100. The sensor 120d is configured to generate a signal that can indicate to the auxiliary operations computer 110, information about an operating state of the vehicle 100. The information may be provided in the form of digital data that indicates to the auxiliary operations computer 110 whether the gear assembly has been activated to place the engine of the vehicle 100 in a drive mode of operation, a neutral mode of operation, or a parked mode of operation.

Yet another sensor 120e may be coupled to an ignition switch of the vehicle 100 for detecting a position of the ignition switch (lock, accessories, on, and start positions) and/or to detect a removal of a vehicle key from the ignition switch.

In some cases, the auxiliary operations computer 110 can communicate with the vehicle computer 105 to obtain information about the state of the vehicle 100. The state of the vehicle 100 can be evaluated by the auxiliary operations computer 110 to determine intentions of the driver 125 such as, for example, whether the driver 125 intends to exit the vehicle 100. Placing the vehicle 100 in a parked condition can provide an indication to the auxiliary operations computer 110 that the driver 125 may be intending to exit the vehicle 100.

Figure 2:
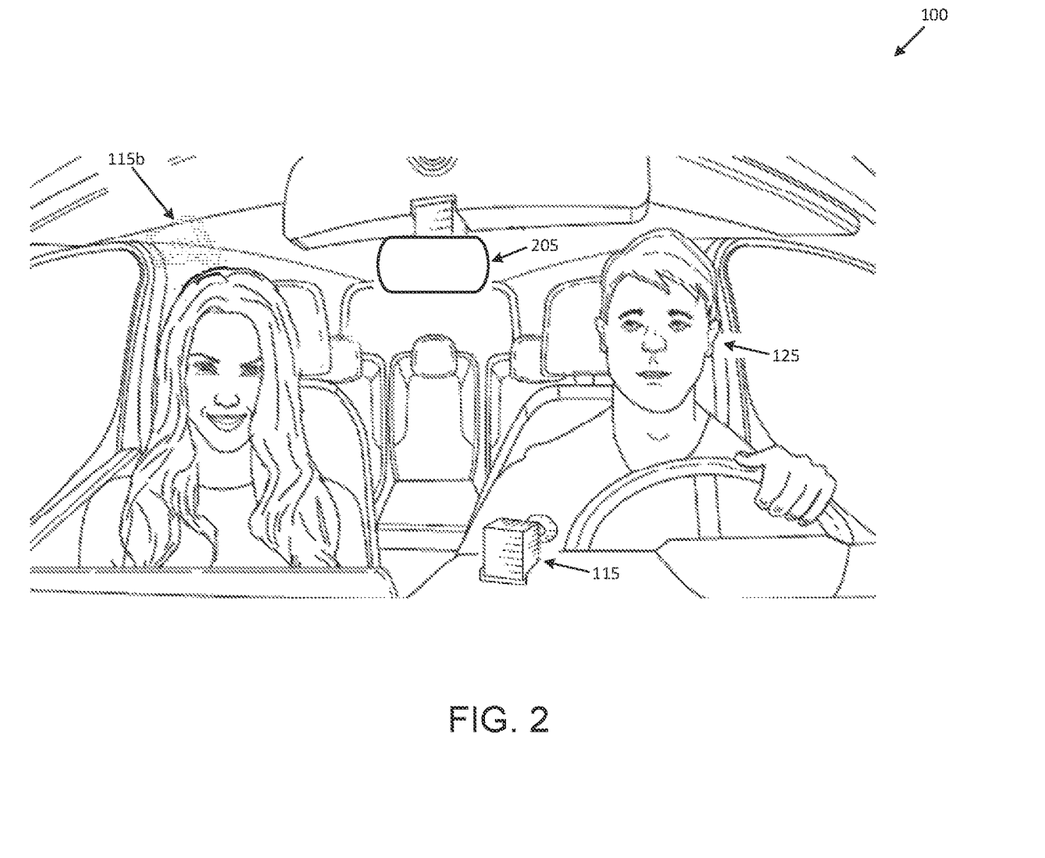
FIG. 2 illustrates an example scenario where a direction of gaze of a driver is monitored by a backseat occupancy alert system in accordance with the disclosure.

FIG. 2 illustrates an example scenario where a direction of gaze of the driver 125 is monitored by the imaging system 115 in accordance with the disclosure. In this example scenario, the camera 115a is mounted upon a dashboard of the vehicle 100 and the camera 115b is mounted upon a side pillar of the frame of the vehicle 100 on the passenger side. In another implementation, the camera 115b can be mounted upon a side pillar on the driver side. The camera 115a that is mounted upon the dashboard can be used to capture images of the driver 125 that are conveyed to the auxiliary operations computer 110. The auxiliary operations computer 110 can evaluate the images to obtain information pertaining to the driver 125, such as, for example, a direction of gaze of the driver 125, and actions performed by the driver 125 (operating a gear shifter, opening a door of the vehicle 100, etc.). Some of these actions can be performed by the auxiliary operations computer 110 in response to receiving a signal (or signals) from the sensor system 120.

In an example method of operation in accordance with the disclosure, the camera 115a captures an image of the face of the driver 125. In some implementations, the camera 115a can be a video camera that conveys a video clip or streaming video footage to the auxiliary operations computer 110. The image and/or video is conveyed to the auxiliary operations computer 110, which evaluates the image and/or video to determine whether the driver 125 is looking towards a rear-view mirror 205 of the vehicle 100. More particularly, the auxiliary operations computer 110 may evaluate the eyes of the driver 125 to detect a direction of gaze. In one case, the direction of gaze may be out of the rear window of the vehicle 100. In another case, the direction of gaze may be directed towards the back seat of the vehicle 100. The direction of gaze may be used by the auxiliary operations computer 110 has checked the occupancy of the back seat before exiting the vehicle 100 (for example, in order to check if a child is seated in the back seat).

The image and/or video captured by the camera 115a may include not only the face of the driver 125 but the body of the driver 125 as well. Such an image and/or video may be evaluated by the auxiliary operations computer 110 to determine whether the driver 125 is performing actions indicating his/her intent to exit the vehicle. For example, the actions can involve adjusting the rear-view mirror 205, activating the door handle of the driver door, and moving the gear shift assembly. Actions involving the rear-view mirror 205 can include the driver 125 changing an angle of view of the rear-view mirror 205. In one case, the driver 125 may place the rear-view mirror 205 at a first angle in order to look out the rear window of the vehicle 100, and may then change the first angle of view to a second angle in order to look towards the back seat of the vehicle 100. The auxiliary operations computer 110 may determine that the driver 125 is looking towards the back seat of the vehicle 100 when the rear-view mirror 205 is arranged, or is moved, to the second angle of view.

Figure 3:
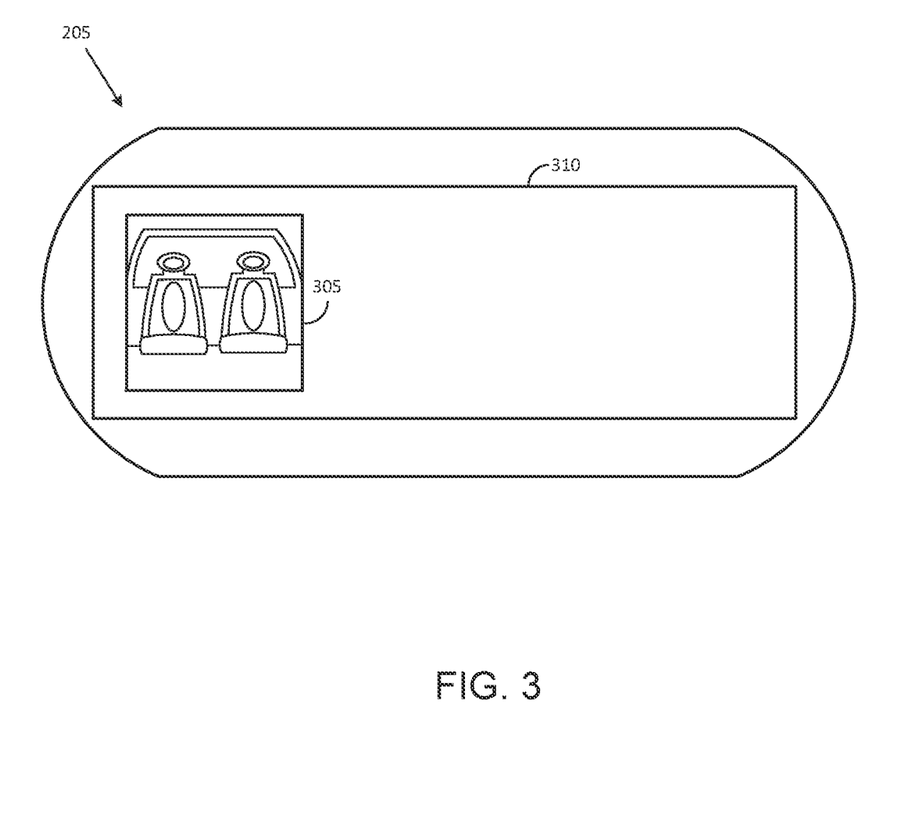
FIG. 3 illustrates an example implementation of a rearview mirror that can be a part of a backseat occupancy alert system in accordance with the disclosure.

FIG. 3 illustrates an example implementation of the rear-view mirror 205 that can be a part of a backseat occupancy alert system in accordance with an embodiment of the disclosure. In this example implementation, the rear-view mirror 205 includes a conventional mirror 310 that the driver 125 may place at a first angle in order to look out the rear window of the vehicle 100 and a second angle to look towards the back seat of the vehicle 100. The example rear-view mirror 205 further includes a display 305 that can display images or video captured by the camera 115b. The images or video show various items in the back of the vehicle 100, such as, for example, an occupant seated in a back seat. The driver 125 may look at the rear-view mirror 205 to check for occupancy of the back seat in the vehicle 100. The auxiliary operations computer 110 may determine that the driver 125 is looking at the back seat of the vehicle 100 when the line-of-sight of the driver 125 is directed towards the rear-view mirror 205.

In another example implementation, the conventional mirror 310 may be omitted and the rear-view mirror 205 includes only the display 305. The driver 125 may activate a control (a touch screen icon on the display 305, for example) to configure the display 305 to show streaming video of objects outside the vehicle 100. The images and/or video displayed on the display 305 at this time may be provided by one or more cameras that are pointing out of the camera (mounted on the trunk or roof of the vehicle 100, for example).

The driver 125 may then activate a control (another touch screen icon on the display 305, for example) to configure the display 305 to show images or streaming video captured by the camera 115b of the back seat of the vehicle. The auxiliary operations computer 110 may determine that the driver 125 is looking at the back seat of the vehicle 100 when the line-of-sight of the driver 125 is directed at the display 305 at this time. In some implementations, the display 305 may be integrated into an infotainment system of the vehicle 100.

Figure 4:
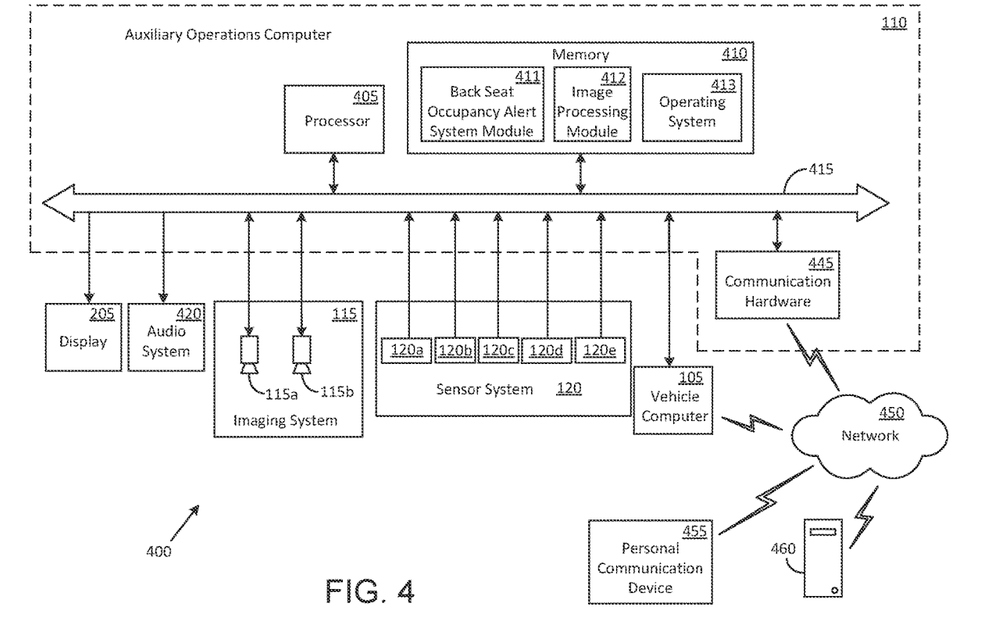
FIG. 4 illustrates some example components that may be included in a backseat occupancy alert system in accordance with an embodiment of the disclosure.

FIG. 4 illustrates some example components that may be included in a backseat occupancy alert system 400 in accordance with an embodiment of the disclosure. The backseat occupancy alert system 400 can include components located in the vehicle 100 such as, for example, the auxiliary operations computer 110, the vehicle computer 105, the rear-view mirror 205, the imaging system 115, the sensor system 120, and an audio system 420. The backseat occupancy alert system 400 can also include components that are located outside the vehicle 100 such as, for example, a server computer 460 that is communicatively coupled to the auxiliary operations computer 110 via a network 450 and a personal communication device 455 that is operable by the driver 125 or any other individual. The personal communication device 455, which can be any device such as, for example, a cellular phone, a landline phone, or a laptop computer, is communicatively coupled to the auxiliary operations computer 110 via the network 450.

The network 450 may include any one, or a combination of networks, such as, for example, the Internet, a telephone network, a cellular network, a cable network, a wireless network, and/or private/public networks such as a local area network (LAN) and a wide area network (WAN). The network 450 may support communication technologies such as TCP/IP, Bluetooth, cellular, near-field communication (NFC), Wi-Fi, Wi-Fi direct, machine-to-machine communication, and/or man-to-machine communication.

The auxiliary operations computer 110 can include a processor 405, a memory 410, and communication hardware 445. The processor 405, the memory 410, and communication hardware 445 are communicatively coupled to each other via a bus 415. The bus 415 can be implemented using one or more of various wired and/or wireless technologies. For example, the bus can be a vehicle bus that uses a controller area network (CAN) bus protocol, a Media Oriented Systems Transport (MOST) bus protocol, and/or a CAN flexible data (CAN-FD) bus protocol. Some or all portions of the bus may also be implemented using wireless technologies such as Bluetooth®, Zigbee®, or near-field-communications (NFC), cellular, Wi-Fi, Wi-Fi direct, machine-to-machine communication, and/or man-to-machine communication to accommodate communications between the auxiliary operations computer 110 and devices such as, for example, the vehicle computer 105, the rear-view mirror 205, the imaging system 115, the sensor system 120, and the audio system 420. These example devices are also communicatively coupled to each other via the bus 415.

The memory 410, which is one example of a non-transitory computer-readable medium, may be used to store an operating system (OS) 413 and various code modules such as, for example, a backseat occupancy alert system module 411 and an image processing module 412. The code modules are provided in the form of computer-executable instructions that can be executed by the processor 405 for performing various operations in accordance with the disclosure.

In one example implementation, the backseat occupancy alert system module 411 can be a software application that is included in the auxiliary operations computer 110 by various entities such as, for example, a manufacturer of the vehicle 100 or an automobile dealership. In another example implementation, the backseat occupancy alert system module 411 can be a software application that is downloaded by an individual, such as the driver 125, into the auxiliary operations computer 110, from a software application source such as FordPass®. The backseat occupancy alert system module 411 may be executed by the processor 405 for performing various operations pertaining to the driver 125 verifying an occupancy of a back seat of the vehicle 100 prior to exiting the vehicle 100.

Such operations can include execution of the image processing module 412 by the processor 405 for purposes of evaluating images provided by the imaging system 115. The images may be evaluated by the backseat occupancy alert system module 411 to determine if the driver 125 has looked towards a child seated in a back seat of the vehicle 100. The backseat occupancy alert system module 411 may produce an alert when the driver 125 of the vehicle 100 fails to look towards the back seat before exiting the vehicle 100. The alert may be propagated by the auxiliary operations computer 110 (via the bus 415) to the rear-view mirror 205 as an image that provides a visual alert and/or to the audio system 420 for emitting an audible alert. The audio system 420 can include components such as, for example, a horn or a chime.

The auxiliary operations computer 110 can communicate with devices located outside the vehicle 100 by use of the communication hardware 445. The communication hardware 445 can include one or more wireless transceivers, such as, for example, a Bluetooth® Low Energy Module (BLEM), a cellular transceiver, or a WiFi transceiver, that allows the auxiliary operations computer 110 to transmit and/or receive various types of signals to/from devices such as the server computer 460 and the personal communication device 455.

In an example implementation, the auxiliary operations computer 110 may transmit an alert to the personal communication device 455 upon detecting a failure on the part of the driver 125 to detect a child in a back seat of the vehicle 100 before exiting the vehicle 100. The driver 125 may be walking away when the alert is received in the personal communication device 455 (a smartphone, for example). The alert may be delivered in various ways such as in the form of an audible beep, a series of audible beeps, and/or an urgent text message. In another example implementation, the auxiliary operations computer 110 may convey the alert to the vehicle computer 105 via the bus 415. The vehicle computer 105 transmits the alert to the personal communication device 455.

Figure 5:
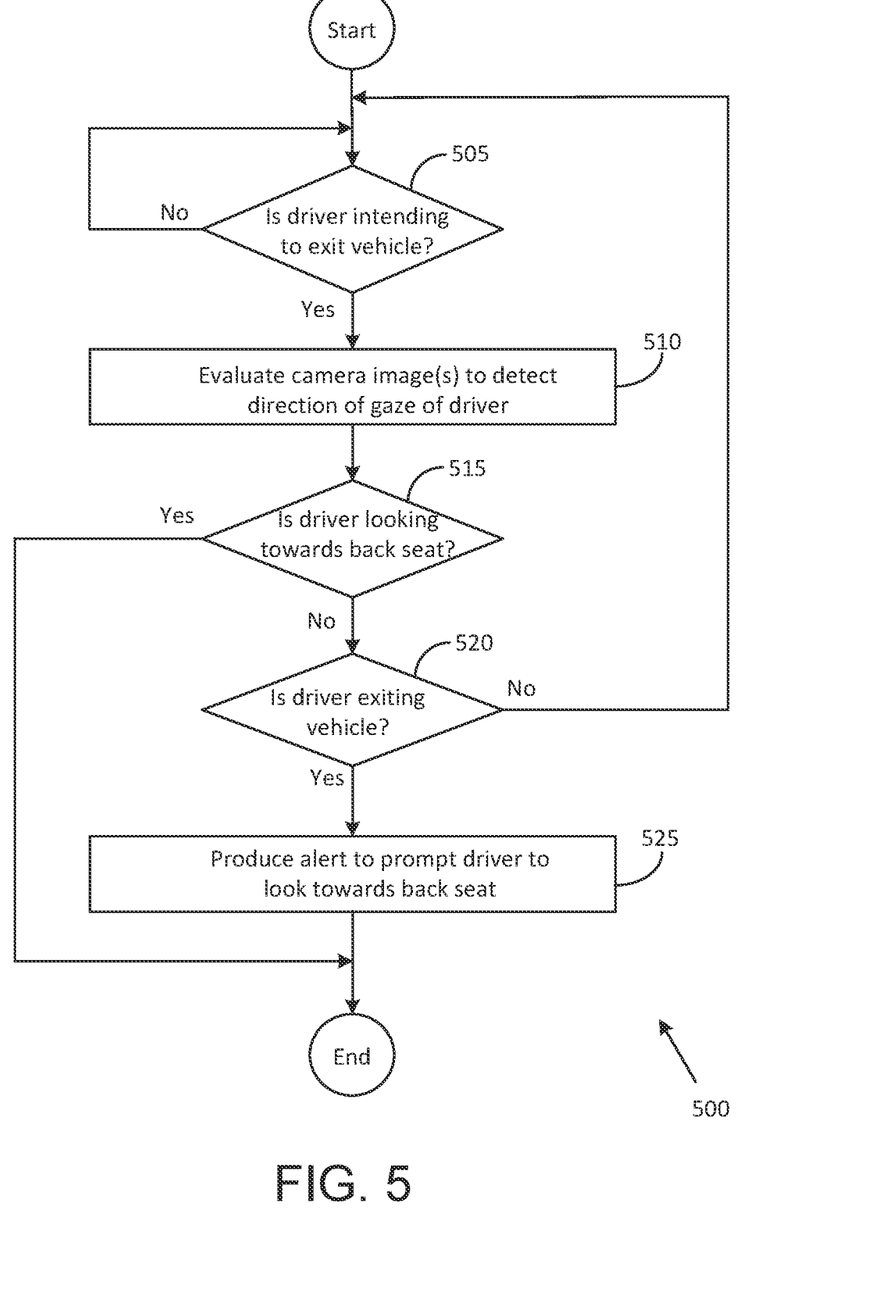
FIG. 5 shows a flowchart of an example method to produce an alert in a backseat occupancy alert system in accordance with the disclosure.

FIG. 5 shows a flowchart 500 of a method for producing an alert upon detecting a failure by a driver to look towards a back seat of a vehicle before exiting the vehicle. The flowchart 500 illustrates a sequence of operations that can be implemented in hardware, software, or a combination thereof. In the context of software, the operations represent computer-executable instructions stored on one or more non-transitory computer-readable media such as the memory 410, that, when executed by one or more processors such as the processor 405, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be carried out in a different order, omitted, combined in any order, and/or carried out in parallel.

Some or all of the operations described in the flowchart 500 may be performed by various components of a backseat occupancy alert system such as the backseat occupancy alert system 400 described above. It must be understood that the backseat occupancy alert system 400 is used herein for describing the flowchart 500 merely as one example system. In other implementations, other components and other configurations of a backseat occupancy alert system may be used to execute the flowchart 500.

At block 505, a determination is made whether the driver 125 is intending to exit the vehicle 100. The determination can be made by initiating the processor 405 to execute the backseat occupancy alert system module 411, which then cooperates with the image processing module 412, to evaluate one or more images. In the example embodiment described above, the image(s) can be provided to the auxiliary operations computer 110 by the camera 115a and/or other cameras of the imaging system 115. The images can be provided in any of various forms such as, for example, a digital image and/or streaming video. Evaluation of the images by the backseat occupancy alert system module 411 can includes cooperating with the image processing module 412, to evaluate the images for identifying various actions performed by the driver 125. The identification process may include, for example, identifying in the image(s), actions such as the driver 125 turning off the engine of the vehicle 100, moving a gear shifter to a parked position, opening a door handle, turning towards the driver-side door, and/or reaching out with his/her hand to the driver-side door handle.

Confirmation of such actions may be obtained by evaluating signals received from sensors such as, for example, the sensor 120*a* (door handle sensor), the sensor 120*d* (gear shifting assembly sensor), and/or the sensor 120*e* (ignition switch sensor).

In some implementations in accordance with the disclosure, the image processing module 412 may detect an intention of the driver 125 to exit the vehicle 100 by evaluating signals received from various sensors rather than by evaluating images received from the imaging system 115. The various sensors may include the sensor 120*a* (door handle sensor), the sensor 120*d* (gear shifting assembly sensor), and/or the sensor 120*e* (ignition switch sensor). In one case, determining an intention of the driver 125 to exit the vehicle 100 can involve evaluating signals received from the sensors for identifying a sequence of actions performed by the driver 125. An example sequence of action that may indicate an intention of the driver 125 to exit the vehicle 100, can include the driver 125 placing a gear of the gear shifting assembly in a park position followed by shutting off the engine of the vehicle 100, removing a vehicle key from the ignition lock, and further followed by activating the door handle of the driver-side door of the vehicle 100 to open the door.

Evaluation of the images can be persisted if the processor 405 determines that the driver 125 is not intending to exit the vehicle 100. However, if the processor 405 determines that the driver 125 is intending to exit the vehicle 100, at block 510, the backseat occupancy alert system module 411 continues to cooperate with the image processing module 412 to detect a direction of gaze of the driver 125. The images can be provided to the auxiliary operations computer 110 by the camera 115*a* in the form of a digital image and/or in the form of streaming video. In one example implementation, the direction of gaze of the driver 125 may be detected by identifying a direction in which the face of the driver 125 is pointed; identifying a direction in which the eyes of the driver 125 are pointed; and/or evaluating facial expressions of the driver 125. In another example implementation, the direction of gaze of the driver 125 may be detected by evaluating actions performed by the driver 125. For example, the driver 125 may move a conventional rear-view mirror from a first angle of view to a second angle of view, where the first angle allows the driver 125 to look out the rear window of the vehicle 100 and the second angle allows the driver 125 to look towards the back seat of the vehicle 100. As another example, the driver 125 may touch an icon on a touchscreen of the display 305 to configure the display 305 to show images or streaming video captured by the camera 115*b* of the back seat of the vehicle 100, as described above. As yet another example, the driver 125 may swivel his/her head sideways and look over his/her shoulder towards the back seat of the vehicle 100 rather than use the rear-view mirror.

At block 515, a determination is made whether the driver 125 is looking towards the back seat of the vehicle 100. The determination can be made based on the evaluation of the direction of gaze of the driver 125 as described above (block 510).

If the driver 125 is looking towards the back seat, the backseat occupancy alert system 400 may draw a conclusion that the driver 125 is checking for occupancy in the back seat (a child, for example) before exiting the vehicle 100, and the flowchart 500 is terminated. The flowchart 500 may be re-executed later on after the driver 125 re-enters the vehicle 100.

If the driver 125 is not looking towards the back seat of the vehicle 100, at block 520, a determination is made whether the driver 125 is exiting the vehicle 100. This action may be carried out by evaluating images received from the imaging system 115 and/or signals received from various sensors. In one case, the evaluation may involve evaluating sensor signals to detect a sequence of actions performed by the driver 125 such as, for example, turning off the engine of the vehicle 100, moving a gear shifter to a parked position, activating the driver-side door handle, and opening the door. Confirmation of the driver 125 is exiting the vehicle 100 may be obtained by evaluating images received from the camera 115*a* and/or the camera 115*b* showing the driver 125 in the process of stepping out of the vehicle 100.

If the driver 125 does not exit the vehicle 100, the processor 405 may continue to execute the backseat occupancy alert system module 411 for determining if the driver 125 is intending to exit the vehicle 100 (block 505) later on. However, if the driver 125 exits the vehicle 100, at block 525, the processor 405 transmits an alert signal to prompt the driver 125 to look towards the back set for checking occupancy. The alert can be provided in various forms. In some cases, the alert may be propagated by the auxiliary operations computer 110 via the bus 415 to the rear-view mirror 205 as an image that provides a visual alert and/or to the audio system 420 for emitting an audible alert. In some other cases, the auxiliary operations computer 110 may transmit an alert to the personal communication device 455 upon detecting a failure on the part of the driver 125 to detect a child in a back seat of the vehicle 100 before exiting the vehicle 100. The driver 125 may be walking away when the alert is received in the personal communication device 455 (a smartphone, for example). The alert may be delivered in various ways such as in the form of an audible beep, a series of audible beeps, and/or an urgent text message.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an example embodiment," "example implementation," etc., indicate that the embodiment or implementation described may include a particular feature, structure, or characteristic, but every embodiment or implementation may not necessarily include the particular feature, structure, or characteristic. Moreover, such phrases are not necessarily referring to the same embodiment or implementation. Further, when a particular feature, structure, or characteristic is described in connection with an embodiment or implementation, one skilled in the art will recognize such feature, structure, or characteristic in connection with other embodiments or implementations whether or not explicitly described. For example, various features, aspects, and actions described above with respect to an autonomous parking maneuver are applicable to various other autonomous maneuvers and must be interpreted accordingly.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A memory device such as the memory 410, can include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Those skilled in the art will appreciate that the present disclosure may be practiced in network computing environments with many types of computer system configurations, including in-dash vehicle computers, personal computers, desktop computers, laptop computers, message processors, user devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method comprising:
    detecting, by a backseat occupancy alert system in a vehicle, an activity that precedes a driver of the vehicle exiting the vehicle, wherein the activity is confirmed by evaluating an image of the back seat or an image of the driver against a signal transferred from at least one sensor;
    detecting, by the backseat occupancy alert system, a failure by the driver to look towards the back seat of the vehicle or look at a display in the vehicle that depicts the image of the back seat, wherein the failure by the driver to look towards the back seat of the vehicle is further detected based at least in part on the driver not adjusting a rear-view mirror of the vehicle or the driver not selecting an icon on the display to display the back seat; and producing, by the backseat occupancy alert system and based on the failure, an alert to prompt the driver to check a passenger occupancy of the back seat of the vehicle.

2. The method of claim 1, wherein the activity that precedes the driver of the vehicle exiting the vehicle comprises turning off an engine of the vehicle, placing the vehicle in a parked condition, and/or opening a door of the vehicle.

3. The method of claim 2, wherein detecting the activity that precedes the driver of the vehicle exiting the vehicle further comprises the backseat occupancy alert system communicating with a vehicle computer of the vehicle to detect turning off the engine of the vehicle and/or placing the vehicle in the parked condition.

4. The method of claim 1, wherein detecting the activity that precedes the driver of the vehicle exiting the vehicle further comprises the backseat occupancy alert system evaluating the image of the back seat or an image of the driver to identify an action carried out by the driver of the vehicle and wherein the activity is detected by the at least one sensor transferring a signal comprising digital data in a binary format or in digital code.

5. The method of claim 1, wherein detecting the failure by the driver to look towards the back seat of the vehicle or look at the display in the vehicle that depicts the image of the back seat comprises the backseat occupancy alert system evaluating an image of the driver to determine a direction of gaze of the driver, and wherein the alert is produced in response to the direction of gaze of the driver corresponding to the driver not looking towards the back seat of the vehicle.

6. The method of claim 1, wherein the method further comprises:
   detecting, by the backseat occupancy alert system, a passenger in the back seat of the vehicle; and
   producing the alert subject to the passenger occupying the back seat of the vehicle.

7. The method of claim 6, wherein the passenger is a child seated in a car seat mounted upon the back seat of the vehicle.

8. A backseat occupancy alert system in a vehicle, comprising:
   a memory that stores computer-executable instructions; and
   a processor configured to access the memory and execute the computer-executable instructions to at least:
      detect an activity that precedes a driver of the vehicle exiting the vehicle, wherein the activity is confirmed by evaluating an image of a back seat or an image of the driver against a signal transferred from at least one sensor;
      detect a failure by the driver to look towards the back seat of the vehicle, wherein the failure by the driver to look towards the back seat of the vehicle is further detected based at least in part on the driver not adjusting a rear-view mirror of the vehicle or the driver not selecting an icon on the display to display the back seat; and
      produce, upon detecting the failure, an alert to prompt the driver to check a passenger occupancy of the back seat of the vehicle.

9. The backseat occupancy alert system of claim 8, wherein the activity that precedes the driver of the vehicle exiting the vehicle comprises turning off an engine of the vehicle, placing the vehicle in a parked condition, and/or opening a door of the vehicle.

10. The backseat occupancy alert system of claim 9, the processor is configured to access the memory and execute additional computer-executable instructions to:
    communicate with a vehicle computer of the vehicle to detect turning off the engine of the vehicle and/or placing the vehicle in the parked condition.

11. The backseat occupancy alert system of claim 8, wherein the processor is configured to access the memory and execute additional computer-executable instructions to:
    evaluate an image received from a camera to detect the failure by the driver to look towards the back seat of the vehicle, and wherein the alert is produced in response to the direction of gaze of the driver corresponding to the driver not looking towards the back seat of the vehicle, and wherein the activity is detected by the at least one sensor transferring a signal comprising digital data in a binary format or in digital code.

12. The backseat occupancy alert system of claim 8, the processor is configured to access the memory and execute additional computer-executable instructions to:
    detect a passenger in the back seat of the vehicle; and
    produce the alert subject to the passenger occupying the back seat of the vehicle.

13. The backseat occupancy alert system of claim 12, wherein the passenger is a child seated in a car seat mounted upon the back seat of the vehicle.

14. A method comprising:
    determining, by a backseat occupancy alert system, that a driver of a vehicle has switched off an engine of the vehicle, wherein the switching off the engine is confirmed by evaluating an image of a back seat or an image of the driver against a signal transferred from at least one sensor;
    detecting, by the backseat occupancy alert system, a direction of gaze of the driver;
    determining, by the backseat occupancy alert system and based on the direction of gaze of the driver, a failure by the driver to look towards the back seat of the vehicle after turning off the engine of the vehicle, wherein the failure by the driver to look towards the back seat of the vehicle is further detected based at least in part on the driver not adjusting a rear-view mirror of the vehicle or the driver not selecting an icon on the display to display the back seat; and
    producing, by the backseat occupancy alert system and based on the failure, an alert to prompt the driver to check a passenger occupancy of the back seat of the vehicle.

15. The method of claim 14, wherein determining that the driver of the vehicle has switched off the engine of the vehicle comprises the backseat occupancy alert system communicating with a vehicle computer of the vehicle to detect an operating status of the engine.

16. The method of claim 15, wherein detecting the direction of gaze of the driver comprises the backseat occupancy alert system evaluating an image received from a camera in the vehicle, and wherein the alert is produced in response to the direction of gaze of the driver corresponding to the driver not looking towards the back seat of the vehicle, and wherein the switching off the engine is detected by the at least one sensor transferring a signal comprising digital data in a binary format or in digital code.

17. The method of claim 14, wherein the method further comprises:

detecting, by the backseat occupancy alert system, a passenger in the back seat of the vehicle; and producing the alert subject to the passenger occupying the back seat of the vehicle.

18. The method of claim 17, wherein the passenger is a child seated in a car seat mounted upon the back seat of the vehicle.

19. The method of claim 17, wherein detecting the passenger in the back seat of the vehicle comprises the backseat occupancy alert system evaluating an image received from a camera in the vehicle.

20. The method of claim 17, wherein the alert to prompt the driver to check the passenger occupancy of the back seat of the vehicle is an audible alert and/or a visual alert.

* * * * *